(12) United States Patent
Barkai et al.

(10) Patent No.: US 6,188,691 B1
(45) Date of Patent: Feb. 13, 2001

(54) MULTICAST DOMAIN VIRTUAL LOCAL AREA NETWORK

(75) Inventors: Sharon Barkai, Shoham; Eldad Bar-Eli, Ramat Hasharon; Yoram Shamir, Kiriat Ono, all of (IL)

(73) Assignee: 3Com Corporation, Santa Clara, CA (US)

(*) Notice: Under 35 U.S.C. 154(b), the term of this patent shall be extended for 0 days.

(21) Appl. No.: 09/039,725

(22) Filed: Mar. 16, 1998

(51) Int. Cl.$^7$ .................................................. H04L 12/28
(52) U.S. Cl. .................... 370/390; 370/397; 370/399; 370/409
(58) Field of Search ..................................... 370/390, 392, 370/397, 399, 401, 409

(56) References Cited

U.S. PATENT DOCUMENTS

| | | |
|---|---|---|
| 4,823,338 | 4/1989 | Chan et al. . |
| 4,975,906 | 12/1990 | Takiyasu et al. . |
| 5,214,646 | 5/1993 | Yacoby . |
| 5,280,476 | 1/1994 | Kojima et al. . |
| 5,280,481 | 1/1994 | Chang et al. . |
| 5,315,582 | 5/1994 | Morizono et al. . |
| 5,321,693 | 6/1994 | Perlman . |
| 5,321,694 | 6/1994 | Chang et al. . |
| 5,329,527 | 7/1994 | Ujihashi et al. . |
| 5,329,619 | 7/1994 | Page et al. ............................ 395/200 |
| 5,345,558 | 9/1994 | Opher et al. ......................... 395/200 |
| 5,390,184 | 2/1995 | Morris . |
| 5,394,402 | 2/1995 | Ross . |
| 5,408,469 | 4/1995 | Opher et al. . |
| 5,444,702 | 8/1995 | Burnett et al. . |
| 5,483,536 | 1/1996 | Gunji et al. ........................ 370/85.14 |
| 5,519,704 | 5/1996 | Farinacci et al. . |
| 5,548,646 | 8/1996 | Aziz et al. ............................. 380/23 |
| 5,548,723 | 8/1996 | Pettus ............................... 395/200.01 |
| 5,550,816 | 8/1996 | Hardwick et al. . |
| 5,550,818 | 8/1996 | Brackett et al. ........................ 370/60 |
| 5,566,014 | 10/1996 | Glance .................................. 359/124 |
| 5,583,865 | 12/1996 | Esaki et al. ........................... 370/397 |
| 5,600,644 | 2/1997 | Chang et al. ......................... 370/404 |
| 5,633,869 | 5/1997 | Burnett et al. ....................... 370/396 |
| 5,659,542 | 8/1997 | Bell et al. ............................ 370/496 |
| 5,666,487 | 9/1997 | Goodman et al. .............. 395/200.76 |

FOREIGN PATENT DOCUMENTS

| | | | |
|---|---|---|---|
| WO97/04386 | 2/1997 | (WO) | .............................. G06F/9/455 |
| WO98/02821 | 1/1998 | (WO) | .............................. G06F/13/00 |

OTHER PUBLICATIONS

Simpson, W., "IP in IP Tunneling", Request for Comments #153, Oct. 1995, 9 pages.

(List continued on next page.)

*Primary Examiner*—Hassan Kizou
*Assistant Examiner*—Mitchell Slavitt
(74) *Attorney, Agent, or Firm*—Howard Zaretsky; David J. Weitz; Wilson Sonsini Goodrich & Rosati

(57) ABSTRACT

A method whereby local area network (LAN) multicast traffic flows are defined and set up by the network management system (NMS). Network efficiency is maximized and performance degradation of the network and workstations connected thereto is reduced. The method utilizes standard 802.1D bridging infrastructure built into conventional level 2 network switching devices to permit a administrator to define a multicast flow, otherwise known as a virtual LAN (VLAN) or a 'Session VLAN,' as a multicast application that can be mapped to a multicast MAC address. The multicast MAC address is then utilized in the transmission of the multicast messages. The NMS declares a session VLAN across all the level 2 devices in the network utilizing standard SNMP and members of the session VLAN can be added and removed. Each device then translates the SNMP requests to an operation on its standard 802.1D static addresses.

14 Claims, 4 Drawing Sheets

OTHER PUBLICATIONS

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

MULTICAST DOMAIN VIRTUAL LOCAL AREA NETWORK

FIELD OF THE INVENTION

The present invention relates generally to computer networking and more particularly relates to a method of creating session layer VLANs.

BACKGROUND OF THE INVENTION

Currently, the number of networks around the world is growing at a faster and faster pace. In addition to new networks being installed existing networks are being upgraded and expanded as companies increase in size and more and more users are added to internal networks. Enterprise networks are presently enjoying a huge increase in popularity with thousands of new nodes and users being added each week. The increased number of users is forcing these enterprise network administrators to add more equipment to meet surging demand and is also forcing the bandwidth capabilities of the enterprise network to increase both in terms of new communication links being added and slow speed links being upgraded to higher bandwidth links.

The use of multicast messages for point to multipoint communications is expected to help alleviate congestion and reduce bandwidth consumption on most enterprise networks in the future. Presently, its use is limited as much of the equipment, i.e., routers etc., that is in use on enterprise networks does not support the new multicast protocols. Eventually, the use of multicast protocols on enterprise networks, will significantly reduce the traffic required to be sent for point to multipoint type communications.

Further, scaleable switching technology has enabled the construction of large switched networks. Broadcast traffic forwarding, however, does not scale well in large networks because all the network hosts are exposed to broadcasts from all other hosts. In other words, in level 2 networks, i.e., networks operating at the link layer in the ISO communication stack, large portions of bandwidth are wasted as each node on the level 2 network receives all multicast traffic. Under normal conditions, multicast traffic is flooded to all stations on the network, thus degrading performance. A suitably configured router (level 3 device) functions to filter the multicast traffic and only forward it to network segments that should receive it. Absent a router or other level 3 filtering, however, each node or workstation on the level 2 network will receive all multicast traffic. Thus, the filtering is performed at each station that receives multicast messages.

Prior art attempts at reducing bandwidth waste in connection with multicast traffic include assigning filters within level 2 switches that function to scan and filters the content of every frame that is received. This requires more complicated hardware and/or software content within the switch which drives up its cost significantly.

In addition, in response to the broadcast traffic flooding problem described above, VLANs can be used to partition the broadcasts into domains that permit the switched network to keep growing. Since it is common nowadays to connect network ports to the switched infrastructure rather than routers or servers, the logical partition of the network no longer directly effects the configuration of higher layer devices. Thus, network administrators can more easily assign and reassign network regions to logical groups without expensive reconfiguration of the host, router or server.

Typically, Media Access Control (MAC) layer multicast messages are forwarded according to the VLAN broadcast data path. However, while broadcast forwarding is usually related to address resolution/SAP) location type administrative traffic, the nature of multicast traffic is usually very different. Multicast traffic, especially IP multicast traffic is typically associated with particular types of application such as video broadcasting and video conferencing. These applications are typically characterized by: (1) setup of a group communication session (2) high traffic volume and (3) the crossing of VLAN boundaries that were previously setup for subnetting purposes.

In addition, conventional VLAN capable network devices are not capable of containing multicast traffic flooding since all regular members of the VLAN will hear multicast traffic. Further, the implementation of the VLAN itself is vendor specific. For example, some implementations are port based while others are based on other criteria.

SUMMARY OF THE INVENTION

The present invention serves to alleviate the problems associated with the prior art by disclosing a method whereby local area network (LAN) multicast traffic flows are defined and set up by the network management system (NMS). This serves to maximize network efficiency and avoids the performance degradation of the network and workstations connected thereto. Utilizing the standard 802.1D bridging infrastructure that is built into conventional level 2 network switching devices, the method of the present invention functions to permit an administrator to define a multicast flow, otherwise known as a virtual LAN (VLAN) or a 'Session VLAN,' as a multicast application that can be mapped to a multicast MAC address. The multicast MAC address is then utilized in the transmission of the multicast messages.

For example, the administrator can assign an IP multicast address to a specific video channel or a video conference. Once assigned, standard Internet Authority for Number Assignment (IANA) mapping is used to derive the multicast MAC address from the IP multicast address. Then, the NMS declares a session VLAN across all the level 2 devices in the network utilizing the standard simple network management protocol (SNMP). Level 2 devices may include any device that functions to examine the level 2 frame content of messages, such as bridges, virtual bridges and switches. The user or administrator has the capability of adding and deleting segments from the VLAN thus created. The user's additions and deletions are translated into SNMP requests which are then transmitted over the network to each level 2 device. Each device then translates the SNMP requests to an operation on its standard 802.1D static addresses.

Thus, the method of the present invention functions to create a concept of the multicast flow, i.e. session VLANs, at the NMS application utilizing a method and framework that expresses the special semantics of a MAC multicast address. It is important to note that rather than map MAC addresses to bridge segments locally, i.e., from the perspective of a single device, using straightforward bridge management MIB manipulation, the user is presented with a view that maps bridge segments to a high level network concept. The high level network concept being the specific multicast service flow previously termed the session VLAN.

The method and approach described above in combination with standard bridging capabilities, i.e. 802.1D bridging, enables complex multicast environments to be created and administered within existing standard bridged networks without the need to upgrade network device hardware or communication protocol stacks.

There is provided in accordance with the present invention a method of establishing a session layer Virtual Local Area Network (VLAN), comprising the steps of defining a multicast flow and assigning members of the session layer VLAN to the multicast flow, mapping a multicast IP address assigned to the session layer VLAN to a multicast Media Access Control (MAC) address, declaring a session layer VLAN across all level 2 devices in the network and enabling multicast MAC traffic on those ports of the level 2 devices corresponding to the members o the session layer VLAN.

The step of enabling multicast MAC traffic utilizes standard 802.1D bridging infrastructure and the step of declaring a session layer VLAN comprises a Network Management System (NMS) sending a primitive to create a session layer VLAN to all level 2 devices in the network. The primitive may comprise a VLAN Create primitive.

In addition the NMS sends the primitive utilizing Simple Network Management Protocol (SNMP) to all level 2 devices in the network and the step of enabling multicast MAC traffic comprises the step of a Network Management System (NMS) sending a primitive to add a port to the session layer VLAN to all level 2 device in the network.

Further, the primitive may comprise a VLAN Add Port primitive and the NMS sends the primitive utilizing Simple Network Management Protocol (SNMP) to all level 2 devices in the network.

Also the step of mapping a multicast IP address utilizes the standard Internet Authority for Number Assignment (IANA) specification. The method further comprises the step of removing a port on a level 2 device from the session layer VLAN. The step of removing a port comprises the step of a Network Management System (NMS) sending a primitive to remove a port from the session layer VLAN to all level 2 device in the network and the NMS sends the primitive utilizing Simple Network Management Protocol (SNMP) to all level 2 devices in the network.

Further, the step of enabling multicast MAC traffic comprises the steps of establishing an input/output port table within each level 2 device, each entry within the table defaulting to the blocked state, thus preventing the flooding of multicast traffic to each port within the device and changing the entry for a port to be added to the session layer VLAN to the pass state, thus permitting multicast traffic to flow only to those ports corresponding to members of the session layer VLAN. The method further comprises the step of changing the entry for a port to be removed from the session layer VLAN to the blocked state thus preventing the flooding of multicast traffic to that particular port.

BRIEF DESCRIPTION OF THE DRAWINGS

The invention is herein described, by way of example only, with reference to the accompanying drawings, wherein:

FIG. 4 is a table illustrating the traffic flow between input ports and output ports within the 802.1D bridging layer wherein all traffic flow is blocked; and FIG. 5 is a table illustrating the traffic flow between input ports and output ports within the 802.1D bridging layer wherein traffic flow is permitted for selected ports.

DETAILED DESCRIPTION OF THE INVENTION

Figure 1:
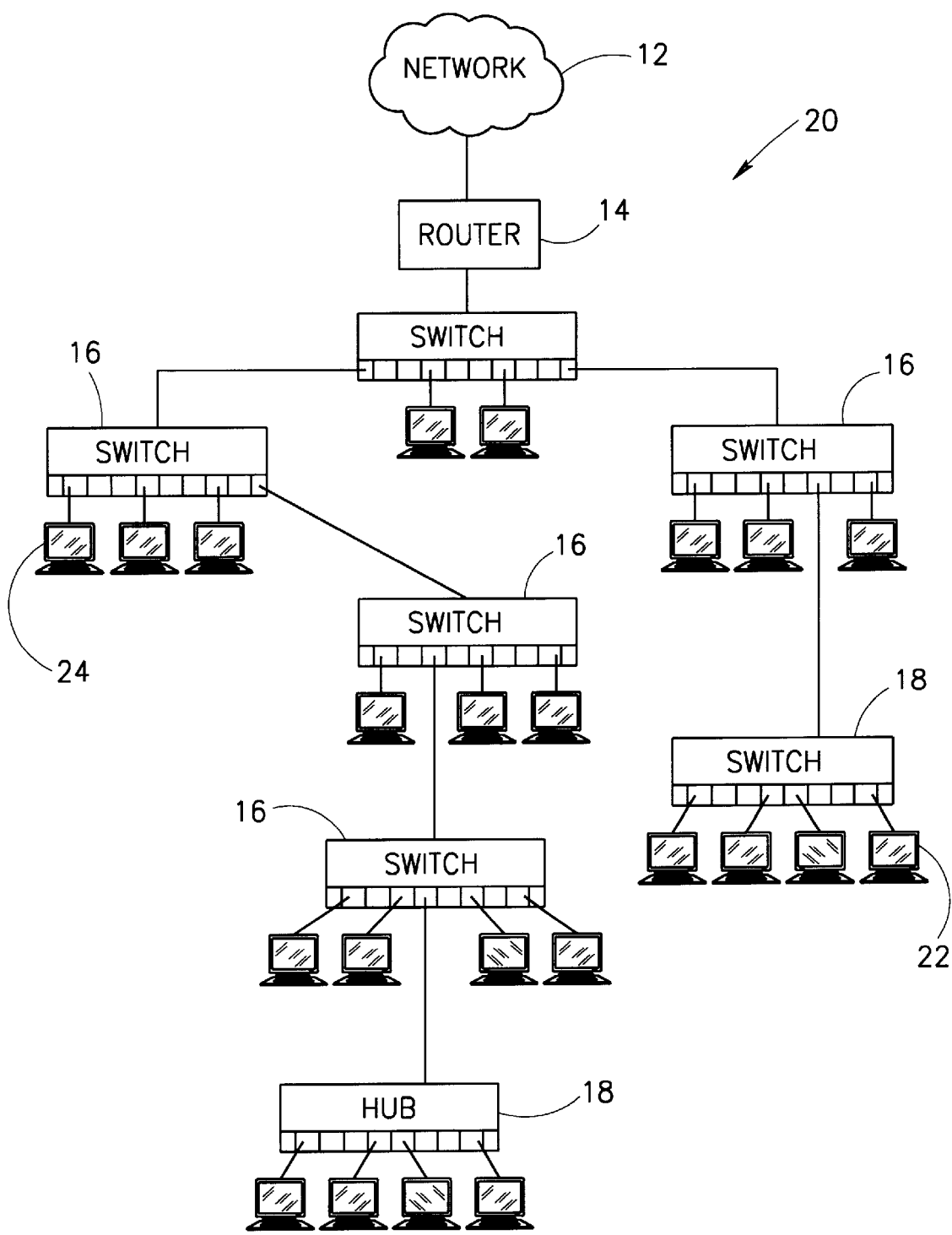
FIG. 1 is a high level block diagram illustrating an example network that typically comprises a combination of routers, switches, hubs and workstations.

A high level block diagram illustrating an example network that typically comprises a combination of routers, switches, hubs and workstations is shown in FIG. 1. The network, generally referenced 20, comprises a network cloud 12,. i.e., an enterprise network, the Internet or other IP type network, one or more routers 14, a plurality of switches 16, hubs 18 and stations 22. The network configuration shown in FIG. 1 is presented as an example only, with an infinite number of configurations actually being possible.

Each segment comprising the network can be considered a collision domain. A virtual LAN or VLAN is defined as a logical collection of segments also known as a subnet. Further, each VLAN can be considered a broadcast domain. As a broadcast domain increases in size, the number of broadcast messages grows at an alarming rate which eventually ties up each station within the domain. Thus, as the broadcast domain grows, the performance of the network degrades. In addition, a switch can be considered to contain multiple virtual bridges. Also, each workstation connected to a switch can be part of more than one VLAN. The different VLANs can be distinguished based on a variety of factors such as protocol, the use of multicast, etc.

As described previously in the Background of the Invention section of this document, the use of multicast messages for point to multipoint communications is expected to help alleviate congestion and reduce bandwidth consumption on enterprise networks in the future. Presently, its use is limited as much of the equipment, i.e., routers, etc., that is in use in enterprise networks does not support the new multicast protocols. In the future, however, the use of multicast protocols in enterprise networks and the Internet, is expected to reduce the traffic required to be sent for point to multipoint type communications.

A disadvantage of the use of standard multicast protocol in the network is that all the ports on each level 2 device, i.e., the switches 16, get flooded with all the multicast traffic since under normal conditions, multicast traffic is flooded to all stations on the network which causes the performance to degrade. The router 14 being a level 3 device filters the multicast traffic and forwards it only to network segments that should receive it. In the network topology shown in FIG. 1, each switch floods the multicast traffic received on one of its ports to all the other ports. Thus, the filtering of the multicast traffic is performed at each station which is very wasteful of processing resources and bandwidth.

Figure 2:
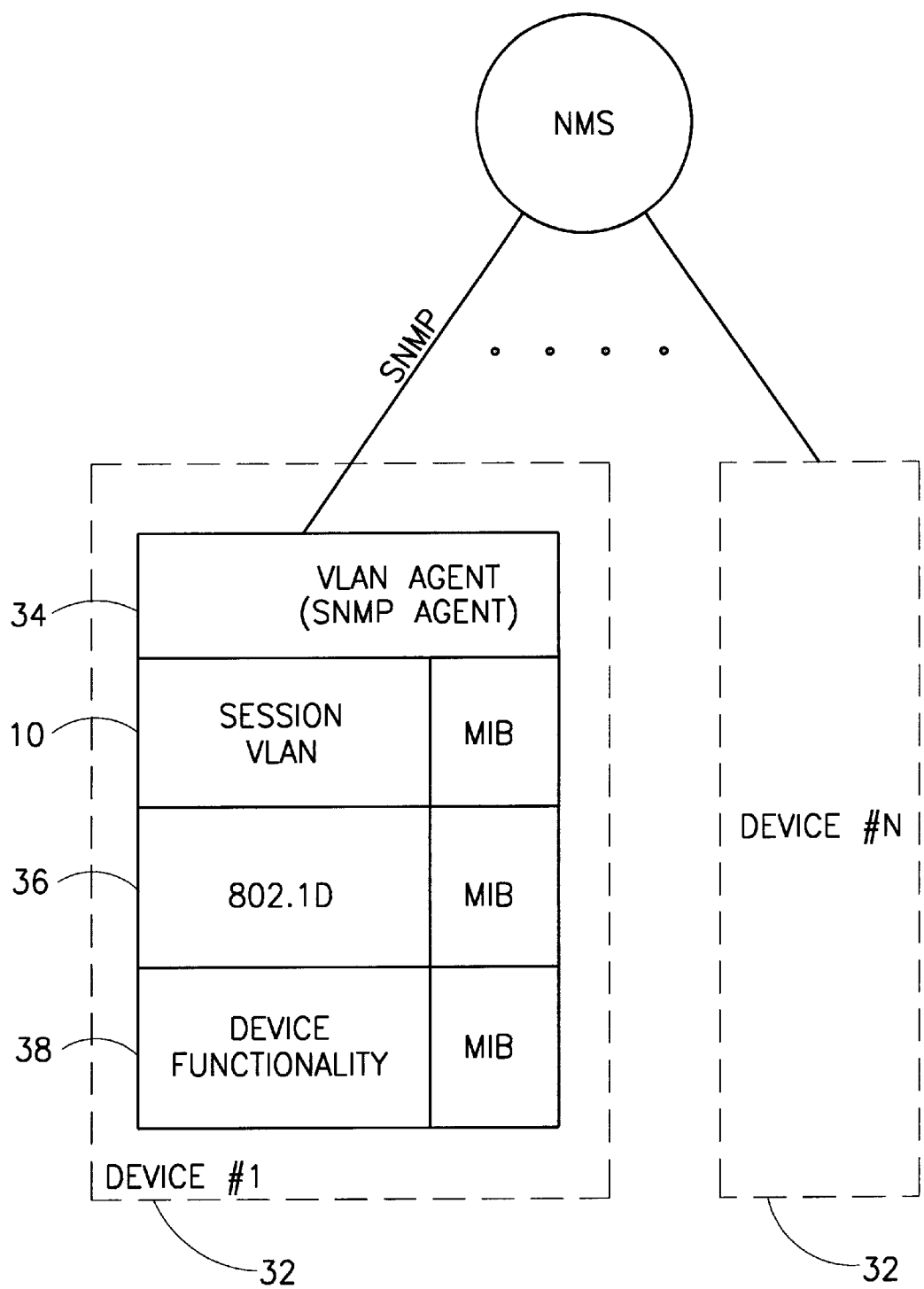
FIG. 2 is a block diagram illustrating the networking device of the present invention in more detail.

A block diagram illustrating the networking device of the present invention in more detail is shown in FIG. 2. An NMS 30 is shown in communication with a plurality of devices 32. A portion of the internal content of one of the devices, i.e., Device #1, is shown in detail. Each device 32 contains a structure similar to that shown for Device #1. The NMS communicates via the SNMP protocol directly with a VLAN agent 34 (also known as an SNMP agent) in each of the devices. The method of the present invention is performed by the Session VLAN component 10. The device 32 also comprises a bridge module 26 that implements standard 802.1D bridging. The functionality of the device, i.e., switch, etc., is represented by the device functionality module 38. The session VLAN module 10, 802.1D bridging module 36 and the device functionality module 38 each have an associated MIB 40, 42, 44, respectively. Each MIB comprises abstractions and primitives that define the functionality of the module. It comprises the entities, such as counters timers, variables, etc., that are accessed by the NMS in operating, administering and maintaining the network. Note that, in an alternative embodiment the Session VLAN module 10 functionality can be incorporated within the VLAN agent module 34.

The method o the present invention overcomes the problems of flooding caused by multicast traffic by using a network management system (NMS) to define and setup local area network (LAN) multicast traffic lows. Network efficiency is maximized and performance degradation of the network and workstations is avoided. The method utilizes the standard 802.1D bridging infrastructure 36 built into the network device 32. Through the NMS or other administrative means an administrator defines a multicast flow, i.e., Session VLAN, as a multicast application that is then mapped algorithmically to a multicast MAC address. The multicast MAC address is then utilized to transmit multicast messages.

For example, a network administrator assigns a video conference an IP multicast address. Standard IANA mapping is then used to algorithmically derive the multicast MAC address from the IP multicast address. The NMS then declares a session VLAN across all the level 2 devices in the utilizing standard simple network management protocol (SNMP). The user or administrator has the ability to add and delete segments from the session VLAN. Each addition and deletion is translated into SNMP requests which are transmitted over the network to the device. Through the VLAN agent 34, the session VLAN module 10 functions to translate the SNMP requests into operation on the 802.1D static addresses maintained within the 802.1D bridging module 36. In this manner, an 'allowed to go to' set of ports from each port to any other port is defined in the device 32.

Thus, a concept of a multicast flow, i.e., session VLANs, at the NMS application is created that utilizes a method that expresses the special semantics of a MAC multicast address. It is important to note that rather than map MAC addresses to bridge segments locally, i.e., from the perspective of a single device, using the trivial bridge management MIB manipulation, the user is presented with a view that maps bridge segments to a high level network concept, i.e., the specific multicast service termed session VLAN.

An advantage of the present invention is that this method combined with standard 802.1D bridging capabilities, enables complex multicast environments to be created and administered within existing standard bridged networks without the need to upgrade network device hardware or communication protocol stacks. The present invention effectively provides level 2 filtering without requiring routers or any other level 3 device.

The effective handling of multicast traffic enables different hosts to participate in multiple multicast sessions without needlessly exposing hosts and network segments in the corresponding broadcast VLANs to voluminous multicast traffic. For example, some hosts can be viewing one channel, e.g., CNN, while other hosts are viewing a second channel. Using the method of the present invention, all the network segments in the VLAN do not needlessly transmit the sum of the multicast session traffic associated with the two channels.

Note that the term Session layer VLAN denotes the desire to deal effectively with multicast sessions utilizing similar administrative techniques used with virtual VLANs. The techniques are limited to those connected with the creation, termination and population of multicast sessions, including the discovery and presentation of these multicast sessions regardless of their origins, i.e. administrative, IGMP snooping, GARP or other registration protocol, etc.

It is important to note that, in practice, Session Layer VLANs are configured utilizing static MAC address entries in the forwarding database. However, due to the particular semantics of the MAC multicast address, the grouping is considered a higher layer grouping, one that may comprise a plurality of members within a single group wherein each member is from layer 2 or layer 3 groups. This makes the Session Layer VLAN configuration independent of and not fixed to either layer 2 or layer 3 VLANs.

Figure 3:
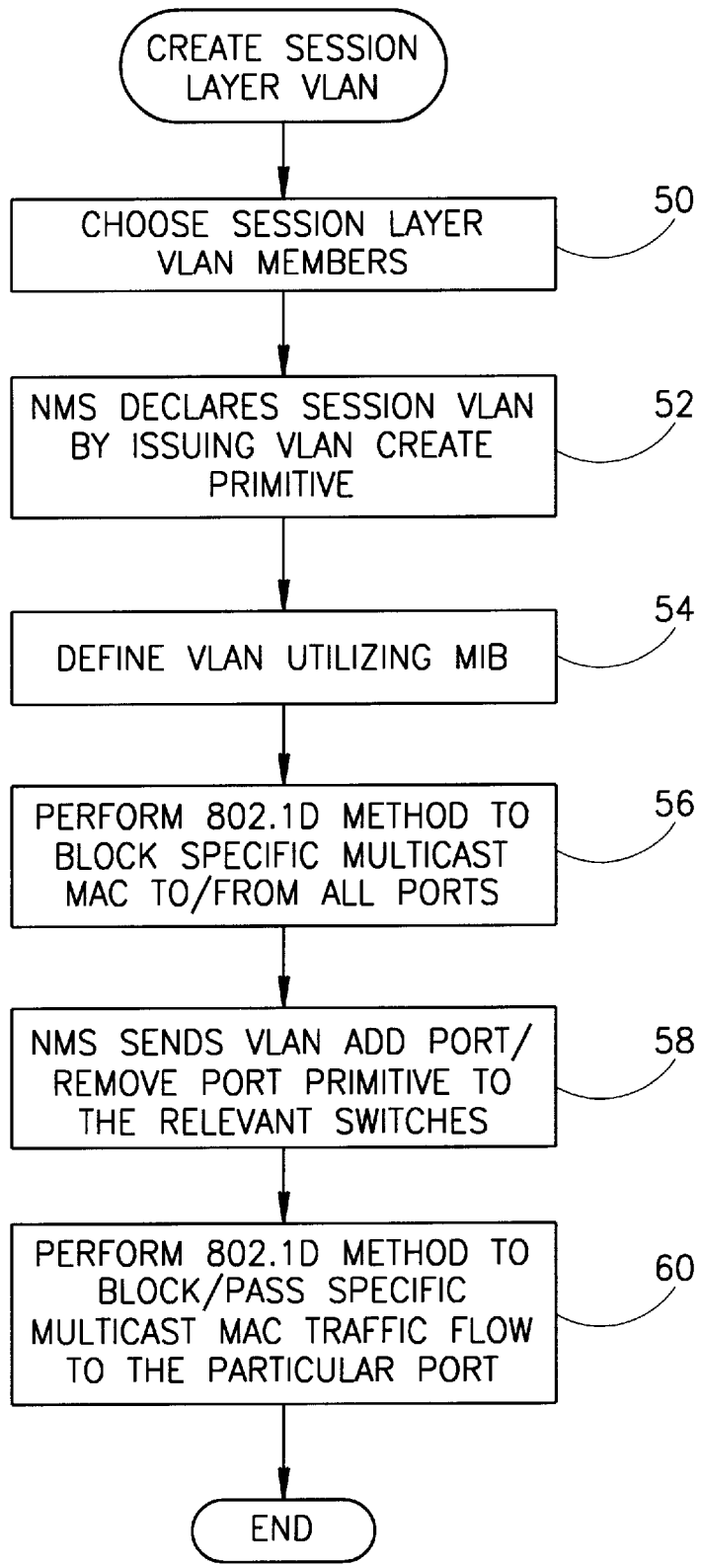
FIG. 3 is a flow diagram illustrating a method of creating a session layer VLAN within a network.

The method of creating a session layer VLAN will now be described in more detail. A flow diagram illustrating a method of creating a session layer VLAN within a network is shown in FIG. 3. The first step is to choose the members that are to make up the session layer VLAN (step 50). This step is performed by the NMS or other suitable management or administrative means. The NMS then declares a session VLAN by issuing a VLAN create primitive (step 52). Note that any known technique used to choose members for a prior art VLAN can be used to choose the members for a session layer VLAN. The implementation of the session VLAN is, however, quite different.

During these steps, a multicast address is assigned to the session VLAN which may, for example, be a video conference. The multicast session address maps to an IP multicast address using the standard 'Session Directory'. The IP multicast address, in turn, maps to a MAC multicast address algorithmically using the IANA standard specification. The 802.1D standard specification defines a mechanism to filter MAC multicast frames from port to port using static MAC addresses.

The VLAN is a global entity in the network which defines a data flow. The primitives associated with VLANs include the following:

VLAN Create
VLAN Remove
VLAN Add Port
VLAN Remove Port

These primitives are issued by the NMS via SNMP since the NMS is the entity that has knowledge of the members of the session group and their addresses and physical locations, i.e., port locations etc.

The NMS uses the VLAN Create primitive to declare the session VLAN. It sends the VLAN Create message to all the switches or other level 2 devices within the management domain. Next, the switches define the VLAN using the MIB or other suitable means to define data VLANs (step 54). The primitives are translated by the bridge layer using the 802.1D method which functions to block specific MAC multicast addresses to/from all the ports (step 56).

The NMS then sends VLAN Add Port and/or VLAN Remove Port primitives to the switch associated with the member of the VLAN. A VLAN primitive is sent to each relevant switch having a port associated with a member of the specific session VLAN (step 58). Within the switch., the VLAN Add Port and VLAN Remove Port primitives are translated to 802.1D operations that enable or disable multicast MAC traffic to the particular port associated with the member of the session VLAN (step 60).

Figures 4, 5:
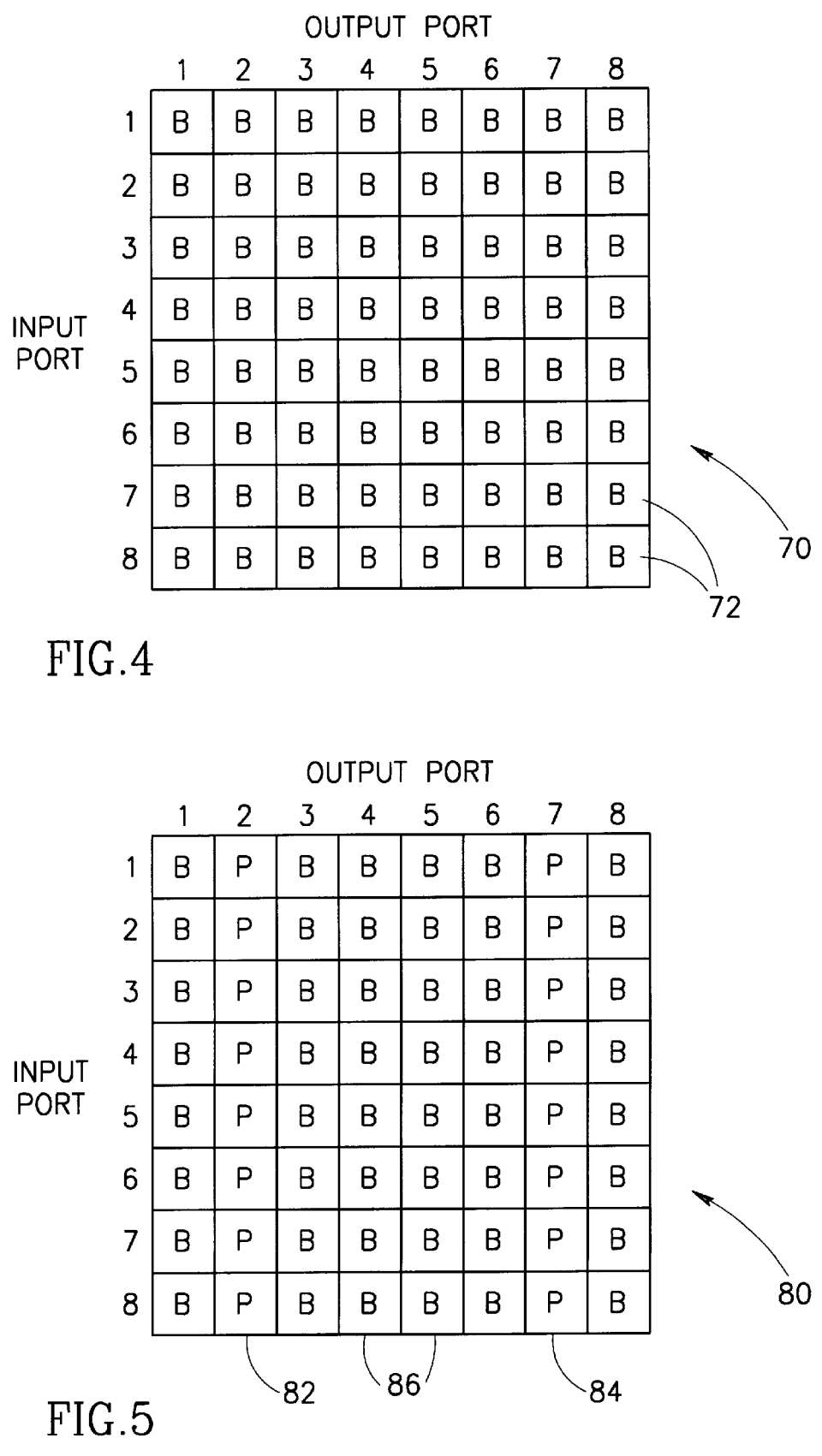

The operations within the standard bridging layer for implementing the session layer VLAN will now be described in more detail. A table illustrating the traffic flow between input ports and output ports within the 802.1D bridging layer wherein all traffic flow is blocked is shown in FIG. 4. Note that a separate table is maintained in the switch for each individual session VLAN created. This is the state of the table after the VLAN is defined (see step 56 FIG. 3)

but before any ports are added. In the table 70 the letter 'B' denotes 'block' and the letter 'P' denotes 'pass'. Each port is capable of blocking traffic originating from a specific port. Thus, for the eight port switch used in the tables in FIGS. 4 and 5, there are 64 entries 72 since each output port can receive data from all the other ports. Note that the eight port switch is used for illustration purposes and that one skilled in the networking art could apply the principles of the present invention to a switch of arbitrary size.

An example of one possible format for the VLAN Create primitive is as follows. VLAN Create <VLAN name><VLAN IP multicast address><VLAN MAC multicast address> Upon receipt of the message, the 802.1D bridging layer creates a new table 70 for the session VLAN and defaults all the entries 72 to the blocked state. At this point, all multicast traffic is blocked at each port in the switch, thus preventing the flooding of multicast traffic on all ports on all level 2 devices.

As described previously, the NMS issues the VLAN Add Port primitive to add a port to a session VLAN. Each port that is added is associated with a member of the session VLAN. A table illustrating the traffic flow between input ports and output ports within the 802.1D bridging layer wherein traffic flow is permitted for selected ports is shown in FIG. 5. An example format for the VLAN Add Port primitive is shown below.

VLAN Add Port <VLAN name><port>

A similar format is used for the VLAN Remove Port primitive. With reference to FIG. 5, two ports have been added to the session VLAN, ports 2 and 7. This is indicated by the letter 'P' for pass in output port column 2, denoted by reference numeral 82, and output port column 7, denoted by reference numeral 84. All other entries contain the letter 'B' for block.

Thus, multicast traffic input on any of ports 1 through 8 are filtered out and blocked from output ports 1, 3–6, 8. Multicast traffic input on any port is forwarded to output ports 2 and 7 only. In practice, however, if all the level 2 devices perform the method of the present invention, it is not likely that multicast traffic would enter the switch on an input port other than ports 2 or 7.

The process of removing a port is similar to that of adding, except that the 'P' entries in the table are replaced with 'B'. In other words in response to a VLAN Remove Port primitive, multicast traffic entering either of the input ports is blocked from the output port to be removed from the session VLAN. Further, a session is deleted or removed by removing the table, in response to the VLAN Remove primitive.

In an alternative embodiment, the traffic table can be modified to pass multicast traffic to output ports 2 and 7 that originate only from ports 2 or 7. This is in contrast to passing multicast traffic that is input on any of the input ports to output ports 2 and 7.

While the invention has been described with respect to a limited number of embodiments, it will be appreciated that many variations, modifications and other applications of the invention may be made.

What is claimed is:

1. A method of establishing a session layer Virtual Local Area Network (VLAN), comprising the steps of:

defining a multicast flow and assigning members of said session layer VLAN to said multicast flow;

mapping a multicast IP address assigned to said session layer VLAN to a multicast Media Access Control (MAC) address;

declaring a session layer VLAN across all level 2 devices in the network; and enabling multicast MAC traffic on those ports of said level 2 devices corresponding to the members of said session layer VLAN.

2. The method according to claim 1, wherein said step of enabling multicast MAC traffic utilizes standard 802.1D bridging infrastructure.

3. The method according to claim 1, wherein said step of declaring a session layer VLAN comprises a Network Management System (NMS) sending a primitive to create a session layer VLAN to all level 2 devices in the network.

4. The method according to claim 3, wherein said primitive comprises a VLAN Create primitive.

5. The method according to claim 3, wherein said NMS sends said primitive utilizing Simple Network Management Protocol (SNMP) to all level 2 devices in the network.

6. The method according to claim 1, wherein said step of enabling multicast MAC traffic comprises the step of a Network Management System (NMS) sending a primitive to add a port to the session layer VLAN to all level 2 device in the network.

7. The method according to claim 6, wherein said primitive comprises a VLAN Add Port primitive.

8. The method according to claim 6, wherein said NMS sends said primitive utilizing Simple Network Management Protocol (SNMP) to all level 2 devices in the network.

9. The method according to claim 1, wherein said step of mapping a multicast IP address utilizes the standard Internet Authority for Number Assignment (IANA) specification.

10. The method according to claim 1, further comprising the step of removing a port on a level 2 device from said session layer VLAN.

11. The method according to claim 10, wherein said step of removing a port comprises the step of a Network Management System (NMS) sending a primitive to remove a port from the session layer VLAN to all level 2 device in the network.

12. The method according to claim 11, wherein said NMS sends said primitive utilizing Simple Network Management Protocol (SNMP) to all level 2 devices in the network.

13. The method according to claim 1, wherein said step of enabling multicast MAC traffic comprises the steps of:

establishing an input/output port table within each level 2 device, each entry within said table defaulting to the blocked state, thus preventing the flooding of multicast traffic to each port within the device; and changing the entry for a port to be added to said session layer VLAN to the pass state, thus permitting multicast traffic to flow only to those ports corresponding to members of said session layer VLAN.

14. The method according to claim 13, further comprising the step of changing the entry for a port to be removed from said session layer VLAN to the blocked state, thus preventing the flooding of multicast traffic to that particular port.

* * * * *